March 6, 1934.   W. A. NEWMAN   1,950,009
CRANK PIN ASSEMBLY
Filed Dec. 30, 1931
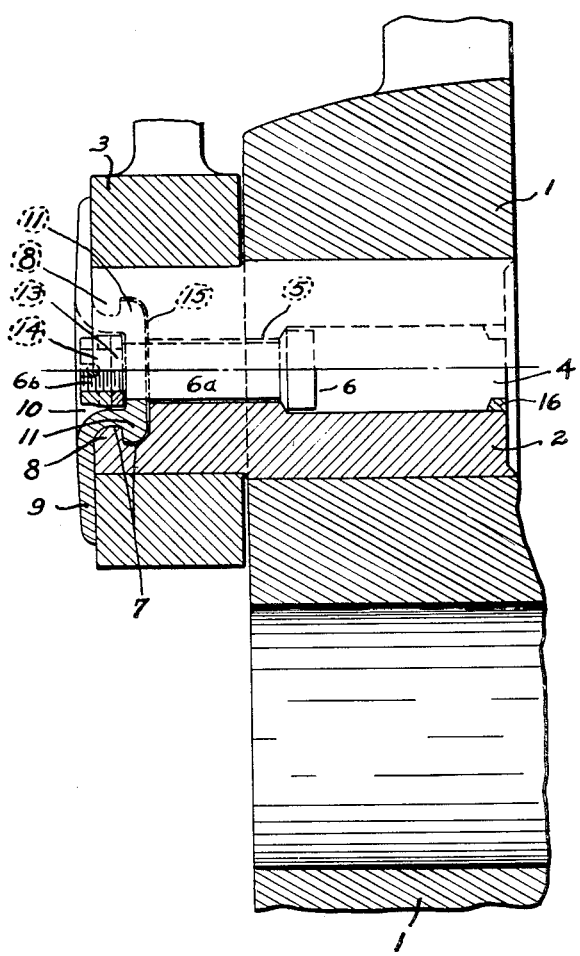
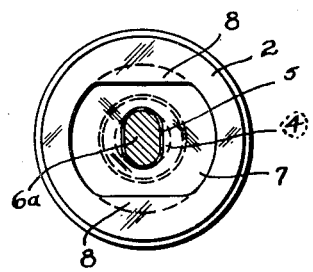
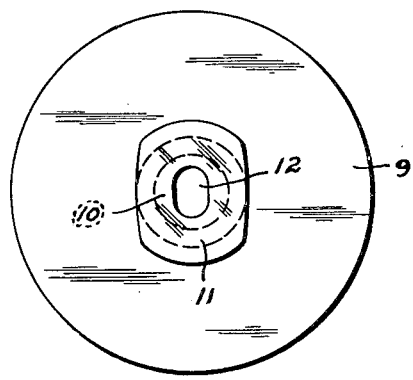
Inventor
William A. Newman
By Rodney Bedell
Attorney Patented Mar. 6, 1934

1,950,009

UNITED STATES PATENT OFFICE 1,950,009

CRANK PIN ASSEMBLY

William A. Newman, Montreal, Quebec, Canada

Application December 30, 1931, Serial No. 583,977

2 Claims. (Cl. 74—38)

The invention relates to crank pin devices and is particularly adaptable for use in railway vehicles wherein side or connecting rods are used.

An object of the invention is to provide a simple and inexpensively constructed form of connection between the connecting rod or side rod and the crank pin to resist side thrust of the rod and further, to provide such a construction as will readily permit disassembly of the connecting rod from the crank pin when desired.

This and various detail objects are attained in the structure illustrated in the accompanying drawing, in which—

Figure 1 is a fragmentary transverse vertical section of a railway vehicle driving wheel crank pin and side connecting rod embodying the invention.

Figure 2 is an outer end view of the crank pin.

Figure 3 is a view of the inner face of the connecting rod retaining element.

In the drawing, 1 indicates a railway vehicle driving wheel provided with an eccentrically mounted crank pin 2 having a side connecting rod 3 journalled thereon.

Crank pin 2 is centrally and longitudinally bored as indicated by the numerals 4 and 5 to permit the reception and prevent the rotation therein of the bolt 6 and is also provided at its outer end with an enlarged transversely recessed portion 7 and diametrically opposed undercut segmental lug portions 8.

Bolt 6 comprises a round head, a shank 6—a of non-circular cross section (Fig. 2) and a threaded round end portion 6—b.

Collar 9, shown in section in Figure 1, is provided with a circular depressed portion 10, in its outer face, and, on its inner face, with a projecting shouldered portion 11 which is centrally drilled, as indicated by the numeral 12, to fit the bolt shank 6—a.

To assemble the structure, collar 9 is fitted to the outer end of the crank pin 2 by having its shouldered portion 11 inserted in the recessed portion 7 of the crank pin and then rotated 90° thereby positioning the shouldered portion 11 behind the segmental lugs 8 to be interlocked therewith against outward movement.

The bolt 6 is then inserted from the inner end of the crank pin 2 and through its hollow portions 4 and 5 and the hole 12 of the collar 9 until the threaded end portion 6—b of the bolt extends into the depressed portion 10 of the collar 9. The washer 13 and the castellated nut 14 are then applied to the bolt and tightened thereon. No clearance exists between the shouldered portion 11 of the collar and segmental lug portion 8 of crank pin. A clearance, as indicated by the numeral 15, is provided between the shouldered portion 11 of the collar and the end of the recess in the pin to facilitate assembly. Lugs 16 are then welded on the surface and near the outer end of the crank pin hollow portion 4 as a means for preventing the bolt 6 from working out of the crank pin should it become broken from any cause or the washer 13 and castellated nut 14 be unintentionally removed.

This device provides a simple, effective bayonet joint structure for taking all of the side thrust independently of any threads or other relatively light or restricted retaining elements, the sole function of the bolt 6 being to prevent the collar 9 from being rotated to an inoperative position. The bolt 6 in its entirety is free at all times of any side thrust or strain and the possibility of failure due to a lost collar from the crank pin is minimized.

Whenever side connecting rods are operated by a crank pin in mechanical practice there are generally definite side clearance limitations to be maintained, this being particularly true in railway practice, and the above design structure provides for maximum clearance by avoiding any projecting bolts or other fastening devices.

Various features and details herein disclosed may be modified without departure from the spirit of the invention and the exclusive use of all features coming within the scope of the claims is contemplated.

What is claimed is:

1. In combination, a crank pin for journaling a connecting rod and having a depression in the outer end with an undercut shoulder, a washer-like rod retaining member of greater diameter than said pin and having a projecting portion on one side shaped to be inserted into said depression and a protuberance on said portion disposed to interlock with said shoulder, when said portion is rotated in said recess, to transmit side thrust from the rod to said pin, said pin and member having alined non-circular perforations and a non-circular bolt element extending through said perforations, said element being non-rotatable in said perforations and preventing relative rotation and separation of said member and said pin.

2. As an article of manufacture, a crank pin for journaling a connecting rod and having a longitudinal central bore and a recess in its outer end, a portion of said bore being non-circular in cross section, said recess having undercut opposed shoulder portions of substantially segmental shape forming a restricted entrance to said recess, and said bore and recess serving to facilitate the mounting of a rod retaining element.

WILLIAM A. NEWMAN.